PATENTS ROOM

6

BEST AVAILABLE COPY

A. BORNEMAN.

CORN-SHELLER.

No. 6,847. Reissued Jan. 11, 1876.

Fig 1

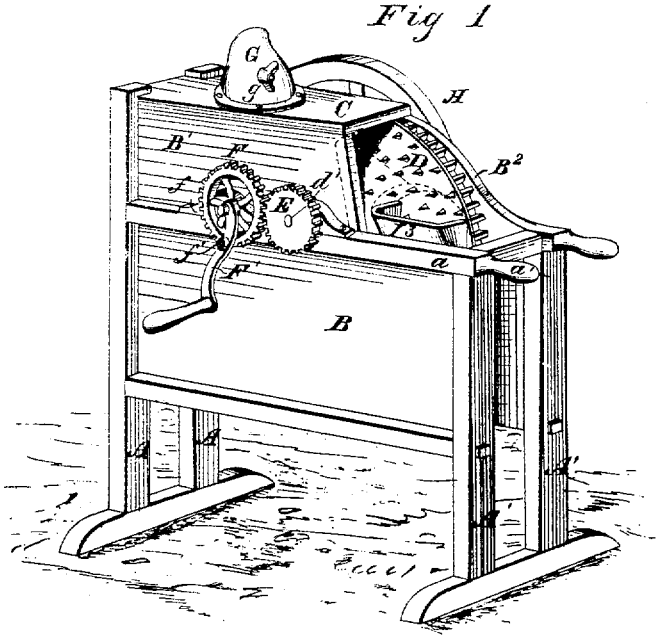

Fig 2.

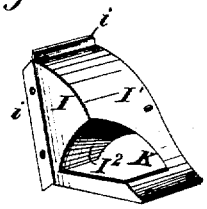

Fig 3.

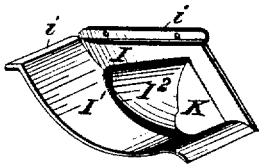

Fig 4.

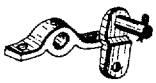

6,847. CORN-SHELLERS. August Borneman, Lancaster, Ohio, assignor to the Hocking Valley Manufacturing Company. Patent No. 135,029, dated Jan. 21, 1873. (Filed Dec. 13, 1875.)

1. A metallic end section or casing for the picker-wheel of a corn-sheller, combined with a cob-chute extension, substantially as and for the purpose specified.

2. A detachable superimposed end section or bonnet for a corn-sheller, provided with an opening for the delivery of the cobs, substantially as specified.

3. A fixed corn-sheller casing, constructed substantially as set forth, combined with a detachable bonnet or rear sectional casing to afford access to the interior of the sheller.

4. The rear curved end of the side casing B², in combination with a rounded metallic bonnet, and a top casing, C, extending to about the center of the picker-wheel, substantially as described.

5. The combination, substantially as set forth, of the frame, the cob-chute secured thereto, and the separate case section or bonnet, with which the cob-chute is connected.

WITNESSES

Wm A Skinkle
F. Stich

INVENTOR

August Borneman.

By his Attorney Marcus S. Hopkins

N. PETERS, PHOTO-LITHOGRAPHER, WASHINGTON, D. C.

BEST AVAILABLE COPY

UNITED STATES PATENT OFFICE

AUGUST BORNEMAN, OF LANCASTER, OHIO, ASSIGNOR TO THE HOCKING VALLEY MANUFACTURING COMPANY.

IMPROVEMENT IN CORN-SHELLERS.

Specification forming part of Letters Patent No. 135,029, dated January 21, 1873; reissue No. 6,847, dated January 11, 1876; application filed December 13, 1875.

*To all whom it may concern:*

Be it known that I, AUGUST BORNEMAN, of Lancaster, county of Fairfield, State of Ohio, have invented a new and useful Improvement in Corn-Shellers, of which the following is a full, clear, and exact description, reference being had to the accompanying drawing, making part of this specification, in which—

Figure 1 is a perspective view of my improved sheller, with the bonnet removed. Fig. 2 is a detached view of the bonnet. Fig. 3 is a detached view of the same in an inverted position, and Fig. 4 is the gear-stand, on which the crank and driving-gear are mounted.

Similar letters of reference denote corresponding parts in all the figures.

The invention relates to a new construction of the frame and casing of the sheller; and consists in making said case in two parts, one of which is wood and the other metal, the metal portion having, by preference, the upper part of the cob carrier or chute attached to it, whereby certain advantages are attained, as will hereinafter be set forth.

In the drawing, A A′ are the posts, B $B^1$ $B^2$ the sides, and C the top, of the inclosing-case. D is the picker-wheel. The inner face of this wheel extends some distance beyond the outer line or edge of the cogs, thus forming a flange of such diameter as to lap over and protect the spaces between the cogs of the pinion, with which wheel D engages and effectually prevents the corn from getting between these gears. E is a spur-gear, mounted on the shaft *d′* of picker-wheel D. F is a driving spur-gear, mounted upon a stud or silent axle projecting from a gear-stand, *f*, and meshing with gear E. F′ is the crank. The eye of the crank is, by preference, circular in form, and is mounted on the hub of gear F, to which it is secured by a bolt, *f′*. I prefer this method of applying the crank instead of making the hub of gear F square and then casting the eye of the crank to fit it, as the parts are much less liable to breakage. It will be readily seen that by this arrangement of the crank and the gears E F the operator can stand upon the right-hand side of the sheller to operate it as the picker-wheel is driven in a reverse direction from that of the crank; and as these gears are mounted wholly outside of the casing they are not liable to be obstructed, and are easily applied and replaced when broken or worn out. The balance-wheel H is mounted upon the shaft of the fluted wheel which is employed in this class of shellers, and is driven by the picker-wheel D. One end of the shaft of wheel H is supported in a bearing cast for it on the gear-stand *f*. G is the throat through which the corn is fed. The usual rag-piece or tongue is attached to the inside of this throat, and is adjusted by means of a set-screw, *g*. The rear end of the rear upper panel of the case conforms substantially to the outline of wheel D, as shown at $B^2$, the front upper panel $B^1$ and top C being cut off at about a right angle on a line at or near the center of said wheel D. I $I^1$ is a bonnet, which serves to complete the inclosing-case, the vertical wall I being rounded to correspond with the opposite side at $B^2$, the other portion $I^1$ forming an extension of the top C. This bonnet is provided with an opening, K, through which the cobs are delivered. $I^3$ is the cob-carrier, made in substantially the same shape as in ordinary side-delivery shellers, and bolted to the framework. $I^2$ is a wing-piece, cast in one piece with the bonnet, and forming the upper part of the cob-chute. The position of the bonnet and chute is shown in dotted lines in Fig. 1. *i i* are flanges on the bonnet, by means of which it may be secured to the wooden portion of the case.

From the above description it will be seen that full and free access can be had to the interior of the sheller by merely removing the bonnet without disturbing the feeding-throat; and I regard the arrangement of the cob-chute at the corner of the case as a very desirable one.

As the wing $I^2$ can be cast in one piece with the bonnet the construction is cheapened, the time which is required to apply a separate piece being saved.

The front posts A extend the full height of the sheller; but, in consequence of using the bonnet to complete the rear part, I am enabled to make the rear posts short and to extend the girts *a* beyond said posts and make handles of them, as at $a'$, which are very convenient in handling the sheller.

Having now described my invention, what I claim as new, and desire to secure by Letters Patent, is—

1. A metallic end section or casing for the picker-wheel of a corn-sheller, combined with a cob-chute extension, substantially as and for the purpose specified.

2. A detachable superimposed end section or bonnet for a corn-sheller, provided with an opening for the delivery of the cobs, substantially as specified.

3. A fixed corn-sheller casing, constructed substantially as set forth, combined with a detachable bonnet or rear sectional casing to afford access to the interior of the sheller.

4. The rear curved end of the side casing $B^2$, in combination with a rounded metallic bonnet, and a top casing, C, extending to about the center of the picker-wheel, substantially as described.

5. The combination, substantially as set forth, of the frame, the cob-chute secured thereto, and the separate case section or bonnet, with which the cob-chute is connected.

AUGUST BORNEMAN.

Witnesses:
J. B. TOWNSLEY,
GEO. W. DEVORE.